(12) United States Patent
Hasbani et al.

(10) Patent No.: US 6,169,977 B1
(45) Date of Patent: Jan. 2, 2001

(54) METHOD AND SYSTEM OF ASSIGNING RATES BASED ON CLASS SERVICE AND DISCOUNT LEVEL

(75) Inventors: Jacques E. Hasbani, Shelton; Linda S. Lin, Huntington, both of CT (US)

(73) Assignee: Pitney Bowes Inc., Stamford, CT (US)

( * ) Notice: Under 35 U.S.C. 154(b), the term of this patent shall be extended for 0 days.

(21) Appl. No.: 09/039,296

(22) Filed: Mar. 14, 1998

(51) Int. Cl.[7] .................................................. G06F 17/00
(52) U.S. Cl. ............................................................. 705/402
(58) Field of Search ....................... 364/464.02, 464.03; 705/402, 410

(56) References Cited

U.S. PATENT DOCUMENTS

| | | | |
|---|---|---|---|
| 4,430,716 | 2/1984 | Dlugos et al. | 705/409 |
| 4,499,545 * | 2/1985 | Daniels et al. | 364/464 |
| 4,910,686 | 3/1990 | Chang et al. | 705/406 |
| 5,072,397 | 12/1991 | Barns-Slavin et al. | 705/402 |
| 5,161,109 | 11/1992 | Keating et al. | 705/410 |
| 5,337,246 * | 8/1994 | Carroll et al. | 364/464.02 |
| 5,454,038 | 9/1995 | Cordery et al. | 705/60 |
| 5,459,670 | 10/1995 | Johnson et al. | 700/224 |
| 5,612,884 * | 3/1997 | Haines | 364/464.13 |
| 5,661,653 * | 8/1997 | Kulik | 705/410 |
| 5,675,493 | 10/1997 | Schwartz et al. | 705/401 |
| 5,699,258 | 12/1997 | Thiel | 705/409 |
| 5,729,459 * | 3/1998 | Brandien et al. | 705/402 |
| 5,842,186 * | 11/1998 | Kulik | 364/464.02 |

FOREIGN PATENT DOCUMENTS 2 232 929 * 1/1991 (GB).

OTHER PUBLICATIONS

No author, "Pitney Bowes introduces PostPerfect, the most important business mailing system yet; first postage meter to use encryption security; easy to use, feature–loaded mailing system touts PC connectivity for ultimate convenience and postage management" Sep. 1995; Business Wire p912091; DialogWeb copy pp. 1–3.*

* cited by examiner

Primary Examiner—Emanuel Todd Voeltz
Assistant Examiner—Thomas A. Dixon
(74) Attorney, Agent, or Firm—Paul A. Levitsky; Michael E. Melton

(57) ABSTRACT

The invention is a method and system of assigning and updating rates within an electronic scale, wherein the rates are based upon class service and discount level. A set of classes of service available for a particular carrier is established. Each one of the classes comprises one or more discount levels. The classes are embedded into the memory of an electronic scale and a set of data comprising the classes is made available to the system. Updating of the data in the embedded set of classes, is accomplished by defining the update data and the one or more discount levels which are available in each class. A system user limits the classes for which they want access and the carrier and/or service choices are encoded; the encoding determining a unique number that is indicative of the parameters selected by a system user for a particular system. The unique number comprises: a carrier token; a class token; and a set of discount level bytes representative of the available discount within the class. The unique number is entered through a setup program embedded in the scale and triggers access to services represented by the class. The system uses the newly available data to supersede corresponding data in the embedded set of classes to create a set of new data. An alternative embodiment of the present invention allows linking of the electronic scale with a data center via communication means such as InterNet access.

19 Claims, 5 Drawing Sheets

METHOD AND SYSTEM OF ASSIGNING RATES BASED ON CLASS SERVICE AND DISCOUNT LEVEL

BACKGROUND OF THE INVENTION

A shipping carrier is a company that provides shipping services for letters, packages, bulk goods, or any other item to be shipped. Carriers can perform a variety of shipping services. For example, they can deliver express shipments, e.g. airmail for letters and second-day air for small packages. Moreover, carriers can deliver ground shipments for packages, or "LTL" shipments for bulk goods. The term "LTL" means "Less Than Truckload" and applies to any ground carrier shipment of standard commodities, for example, rated in units of hundreds of pounds. Shipments of bulk goods or standard commodities usually occupy a portion of a truck trailer, hence "less than truckload," but may require an entire truckload, occasionally known as "TL" shipments.

Each carrier has its own rate structure for charging shippers for transporting their goods. Typically, these rates structures are complex and involve a variety of factors. For example, carriers often charge different prices by weight, sometimes with different weight classifications. As another example, carrier rates may be dependent on the distance to the destination. In addition, some carriers charge a premium for shipping classes, e.g. first class and second class, with shorter or longer guaranteed delivery times. In some cases, carriers may grant discounts for volume. Thus, the business rules for rating items to be transported varies greatly from carrier to carrier. These rating calculations may change over time for a particular carrier as its rates and business rules are updated. Accordingly, it is desirable to provide mechanisms for logistics systems for shipping goods to facilitate updating how carrier rates are calculated.

U.S. Pat. No. 4,430,716 for a POSTAGE VALUE DETERMINING SCALE WITH EXPANDABLE MEMORY PORT, issued Feb. 7, 1984 to Dlugos et al. (Hereinafter referred to as Dlugos), is an example of prior art systems that have proven their market value. Dlugos teaches a postage value determining scale, which includes a processor, which can access postage data stored in a rate PROM mounted on a card or circuit board. The scale's processor is able to calculate postage based upon rate data contained in the PROM. Dlugos is limited in its capabilities by memory constraints associated with the PROM card. These limitations are overcome by an interface cable that allows access to an expanded carrier board if additional service charges need to calculated.

A drawback to Dlugos is memory, another is the number of PROMs that need to be utilized in changing the rates available to the system user. Every time changes to the rate structure, carrier classes, or discount levels had to be communicated for each carrier, a new set of PROMs had to be shipped to the system user.

U.S. Pat. No. 5,072,397 for a CARRIER MANAGEMENT SYSTEM ENABLING DETERMINATION OF CHARGES WITH DISCOUNTS, issued Dec. 10, 1991 to Barns-Slavin et al. (hereinafter referred to as Barns-Slavin), improved upon the teachings of Dlugos by utilizing greater memory capability and assigning class selections to one-touch keys mounted on the scale device. The data processing components of Barns-Slavin would store shipping charge data for a plurality of carriers or shipping classes. Weight data read from the scale would provide the variable needed to calculate appropriate shipping charges. Barns-Slavin also taught the ability to update data by inputting a PROM to the system. Rate changes, where a carrier changes its basic rate structure, still require a PROM card under Barns-Slavin. The result is a system utilizing one or more PROM cards to realize the classes resident thereon, each card subject to change when a customer changed carriers or classes for which they were subscribing.

Thus, the art began to search for a more efficient way of downloading change to systems providing rating capabilities to shippers. U.S. Pat. No. 5,161,109 for an UP/DOWN LOADING OF DATABASES, issued Nov. 3, 1992 to Keating et al. (hereinafter referred to as Keating), attempted to make data availability a more convenient process by providing user devices, such as certain postage meters, with a means of linking directly with a data base at a data center. Keating was limited in its flexibility in that it suitably maintained and distributed data for only one carrier. Rate shopping among carriers and classes of services was limited under the teachings of Keating. There still existed a need for flexibility in parcel processing systems.

One such method for improved flexibility within a carrier environment was disclosed in U.S. Pat. No. 5,661,653 which issued Aug. 26, 1997 to Kulik (hereinafter referred to as Kulik). Kulik taught a method for defining a custom rates template that would allow more efficient handling of rates for mixed mail processing. Kulik was limited in its ability to respond to rates change data once the template had been developed for use.

Therefore, it is an object of the present invention to overcome the limitations of the prior art through a method and system for calculating shipping rates for a plurality of carriers and which allows for ease of updating of individual carrier rates for certain classes and services while significantly reducing costs associated with PROM production, distribution, and storage.

SUMMARY OF THE INVENTION

There exists a need for a less resource-intensive, carrier rating system that can calculate shipping rates for a plurality of carriers and which allows ease of updating of individual carrier rates for certain classes and services. More specifically, there is a need for costs associated with class and discount services available to system users.

These and other needs are met by the present invention, which is a method and system of assigning rates within an electronic scale, wherein the rates are based upon class service and discount level.

The method of the invention begins with the establishment of a set of classes of service available for a particular carrier. Each one of the classes comprises one or more discount levels. The classes are embedded into the memory of an electronic scale and a set of data comprising the classes is made available to the system. Updating of the data in the embedded set of classes, is accomplished by defining the update data and the one or more discount levels which are available in each class. In turn, each of the discount levels is defined.

A system user limits the classes for which they want access as based upon need for a particular carrier's services or based upon whether or not particular carrier discounts are required. The carrier and/or service choices are encoded; the encoding determining a unique number that is indicative of the parameters selected by a system user for a particular system. Thus, all of the available classes and services may be embedded within a given system, but the only services which can be accessed are those that match the unique number and its respective coding.

A system user who desires to use a particular class of services would pay for those services required and a unique number would be generated for the user's system. The unique number comprises a carrier token; a class token; and a set of discount level bytes representative of the available discount within the class. The unique number is entered into the system through a setup program by the system user and triggers access to services represented by the class. The access is accomplished by entering the unique number into a setup program embedded in the electronic scale; the number is then matched against a predetermined list of services available in the electronic scale. An algorithm is then applied to the unique number so that the selected services will be available to the system user when that user utilizes the rating application. The number's corresponding services and data can then be accessed through a rates manager program in the system's rating application which is embedded in the electronic scale. The system uses the newly available data to supersede corresponding data in the embedded set of classes to create a set of new data.

The system's rates manager program returns an assigned discount level to the application, by determining that a class is a discount level class; filtering out non-assigned classes; and returning the assigned class to the application. The rating application comprises a menu selection table which is established by the rating application by placing each of the assigned classes that have been returned to the application by the rates manager into a predetermined table format. An address is established for each element of the menu selection table wherein the address is accessed by the application when a set of rate data for a particular transaction is required by the application. The rates manager utilizes the menu selection table to determine which classes belong to which discount level groups.

Update data can be stored within a memory of the system, or can be stored in a PROM that is interfaced with the electronic scale. The PROM can contain a set of all service updates available at a given point in time. If a PROM is employed, then entry of the unique number to the electronic scale allows only those services available to a particular customer to be accessed by the electronic scale from the PROM so as to update the electronic scale with update data.

An alternative embodiment of the present invention allows linking of the electronic scale with a data center via communication means such as InterNet access. The communication means further comprises: a first modem located at the electronic scale; a second modem located at the data center; linking means for linking the first modem with the second modem; and a communications application for directing the transfer of data between the electronic scale and the data center.

DETAILED DESCRIPTION OF PREFERRED EMBODIMENTS

Figure 1:
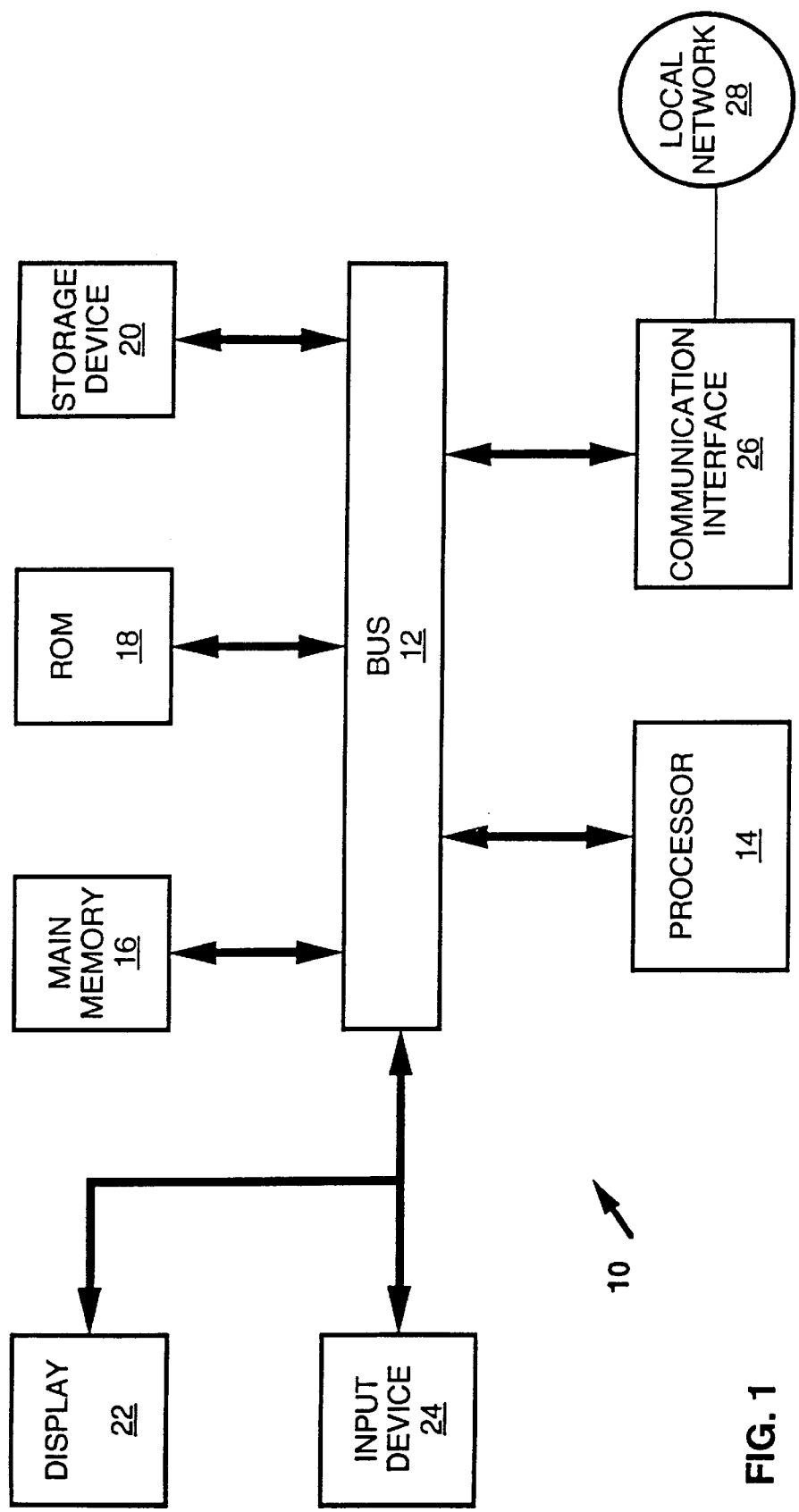
FIG. 1 is a block diagram of a electronic weighing system which is representative of a system which could act as host to the invention's method.

Turning to FIG. 1, there is shown a block diagram of a data processing system 10 which is of an architecture that is suitable for implementing the claimed invention.

Data processing system 10 comprises bus 12, or a similar communications means, for communicating information, and a processor 14 operatively coupled with bus 12 for processing data. Data processing system 10 also includes a main memory 16, such as a random access memory (RAM) or other dynamic storage device, coupled to bus 12 for storing data and instructions to be executed by processor 14. Main memory 16 may also be used for storing temporary variables or other immediate data during execution of instructions by processor 14. Data processing system 10 further comprises a read only memory (ROM) 18, or other static storage device, coupled to bus 12 for storing static data and instructions for processor 14. Storage device 20, such as a PROM, is provided and coupled to bus 12 for storing data and instructions. Common examples of data processing system 12 may include electronic scales and certain carrier manifesting systems.

Data processing system 10 may be coupled via bus 12 to a display 22, such as an LCD or LED, for displaying information to a system user. An input device 24 such as a keyboard, including alphanumeric and/or other keys, is coupled to bus 12 for communicating information and command selections to processor 14.

According to one embodiment of the invention, rating items for carriers is provided by data processing system 10 in response to processor 14 executing one or more sequences of one or more instructions contained in main memory 16. Such instructions may be read into main memory 16 from another computer readable medium, such as storage device 20. Execution of the sequences of instructions contained in main memory 16 causes processor 14 to perform the process steps described herein. One or more processors in a multi-processing arrangement may also be employed to execute the sequences of instructions contained in memory 16. In alternative embodiments, hard-wired circuitry may be used in place of, or in combination with, software instructions to implement the invention. Thus, embodiments of the invention are not limited to any specific combination of hardware circuitry and software.

Data processing system 10 also includes a communication device interface 26 coupled to bus 12. Communication interface 26 provides a two-way data communication coupling to a local network 28. For example, communication interface 26 may be an integrated services digital network (ISDN) card or a modem to provide a data communications connection to a corresponding type of telephone line. As another example, communication interface 26 may be a local area network (LAN) card to provide a data communications connection to a compatible LAN. Wireless links may also be implemented. In any such implementation, communication interface 26 sends and receives electrical, electromagnetic, or optical signals that carry digital data streams representing various types of information.

Figure 2:
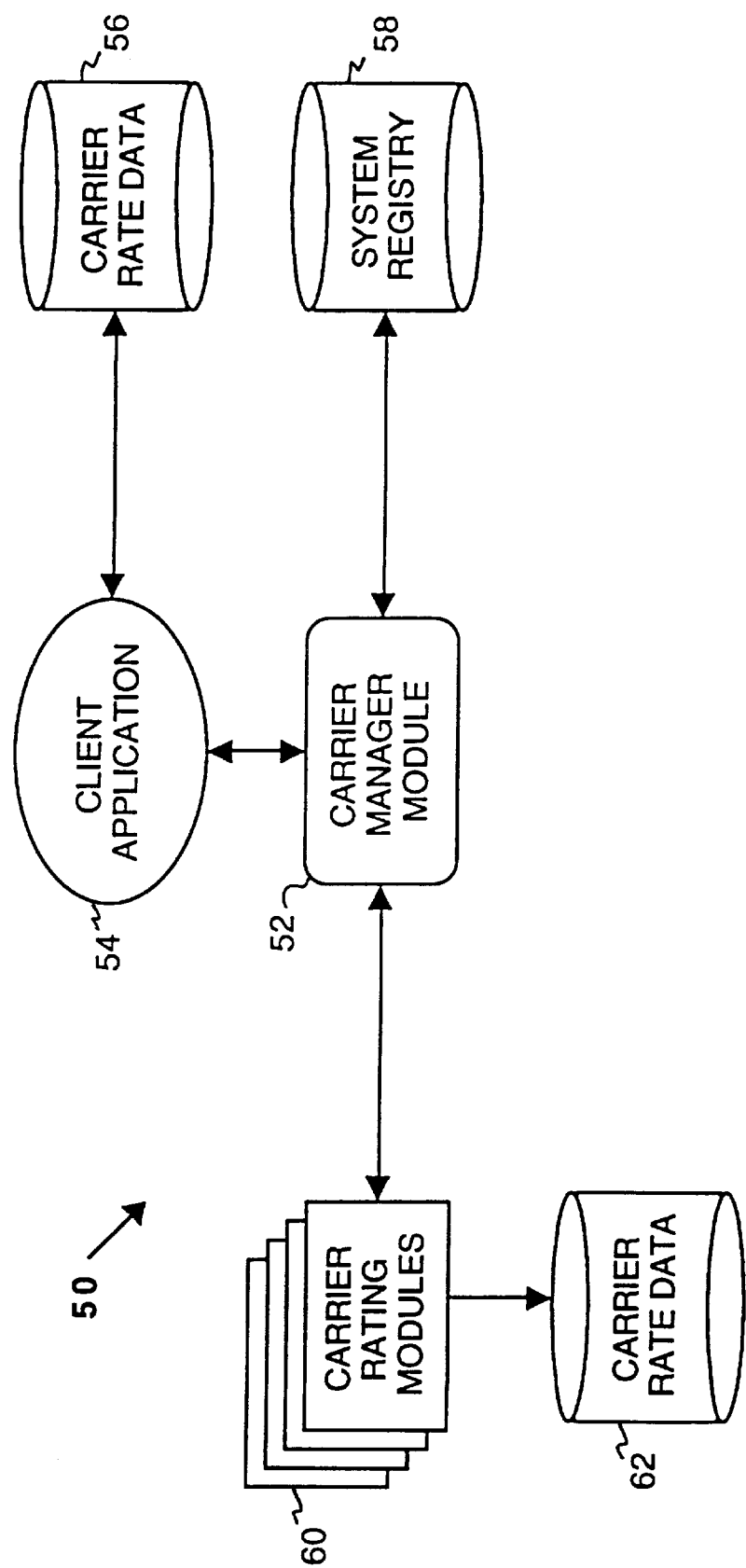
FIG. 2 is an upper level flowchart of a data processing system which is of an architecture that is suitable for implementing the claimed invention.

Turning to FIG. 2, there is shown system 50 which is typical of logistics or shipping applications that can employ rating schemes to determine carrier charges based upon input from more than one input application.

The heart of the system is a carrier manager module 52 which is comprised of a rating engine for performing at least some of the rating related tasks. Carrier manager module 52 interfaces with client application 54 which is configured to perform various shipping related tasks. The carrier manager module 52 is further configured to access entries in system registry 58.

System registry 58 is responsible for loading one of a plurality of carrier rate modules 60 as well as for registering all modules available to the carrier manager module 52. The carrier rating modules 60 are loaded into the executable space of client application 54, thereby avoiding the use of resource intensive inter-process communication (IPC) mechanisms.

Each carrier rating module 60 includes program instructions to access carrier rate data 62 and rate items using business rules encapsulated therein together with rate data associated with a particular carrier. After loading a carrier rating module 60, the carrier manager module 52 provides an entry point in the carrier rate module 60 to the client application 54. In this manner, client application 54 can invoke the instructions in the carrier rate module 60 to rate an item (such as a particular parcel or a particular service) for the carrier associated with the selected rate module 60. Additionally, client application 54 includes prior carrier rating routines of its own for rating items based on carrier rate data 56.

In some system configurations, the revision level of the client application 54 may be such that they were developed prior to the design of the system architecture described herein. For example, client application 54 may be a shipping application for rating parcels shipped by express carriers. When the carrier manager system 50 architecture is designed, it would be a relatively uncomplicated task to upgrade client application 54 to access carrier management module 52 for the carrier rating functions in the new carrier rating modules 60. In the instant example, new carrier rate modules 60 may contain Less Than Truckload (LTL) rating routines for shipping items by truck. Thus, to add trucking functionality to first client application 54's legacy of functions, it is a relatively straightforward process to call the new carrier management module 52 to load the carrier rate modules 60 applicable to LTL rating activities.

Figure 3:
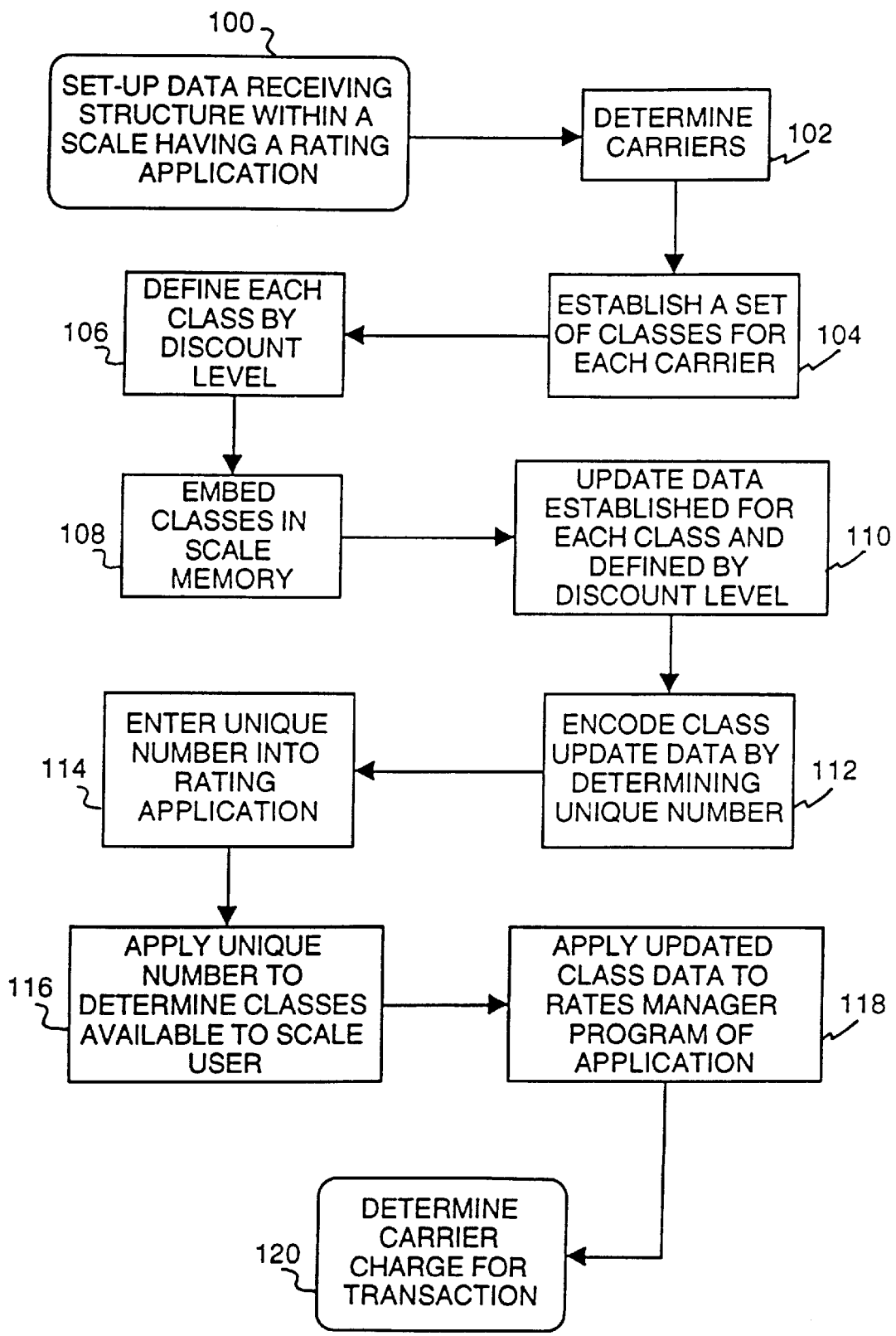
FIG. 3 is an upper level flowchart of the method of utilizing a unique number that can be decoded to provide class and discount access.
Figure 4:
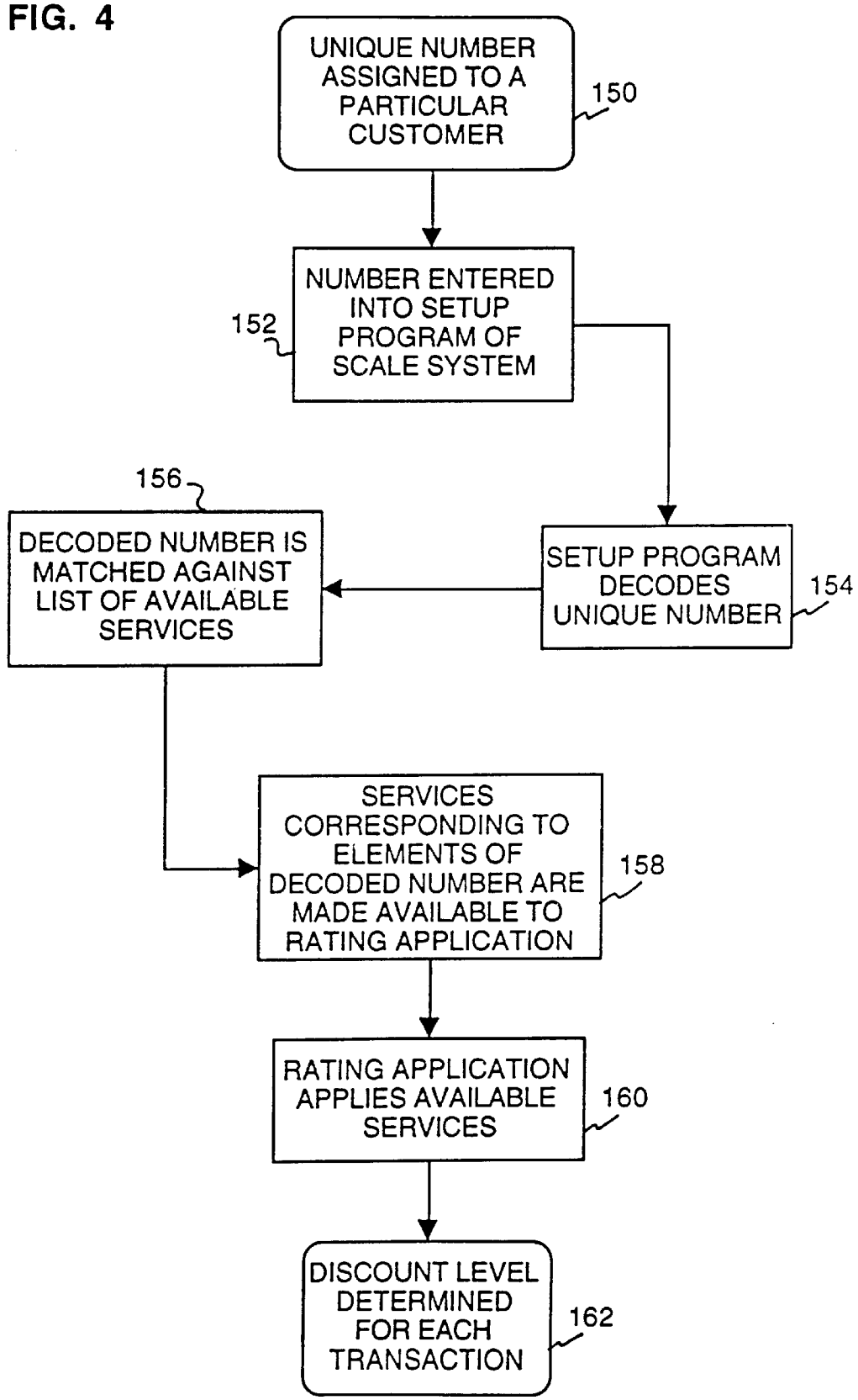
FIG. 4 is a flowchart of the access to service as based upon decoding of a unique number.
Figure 5:
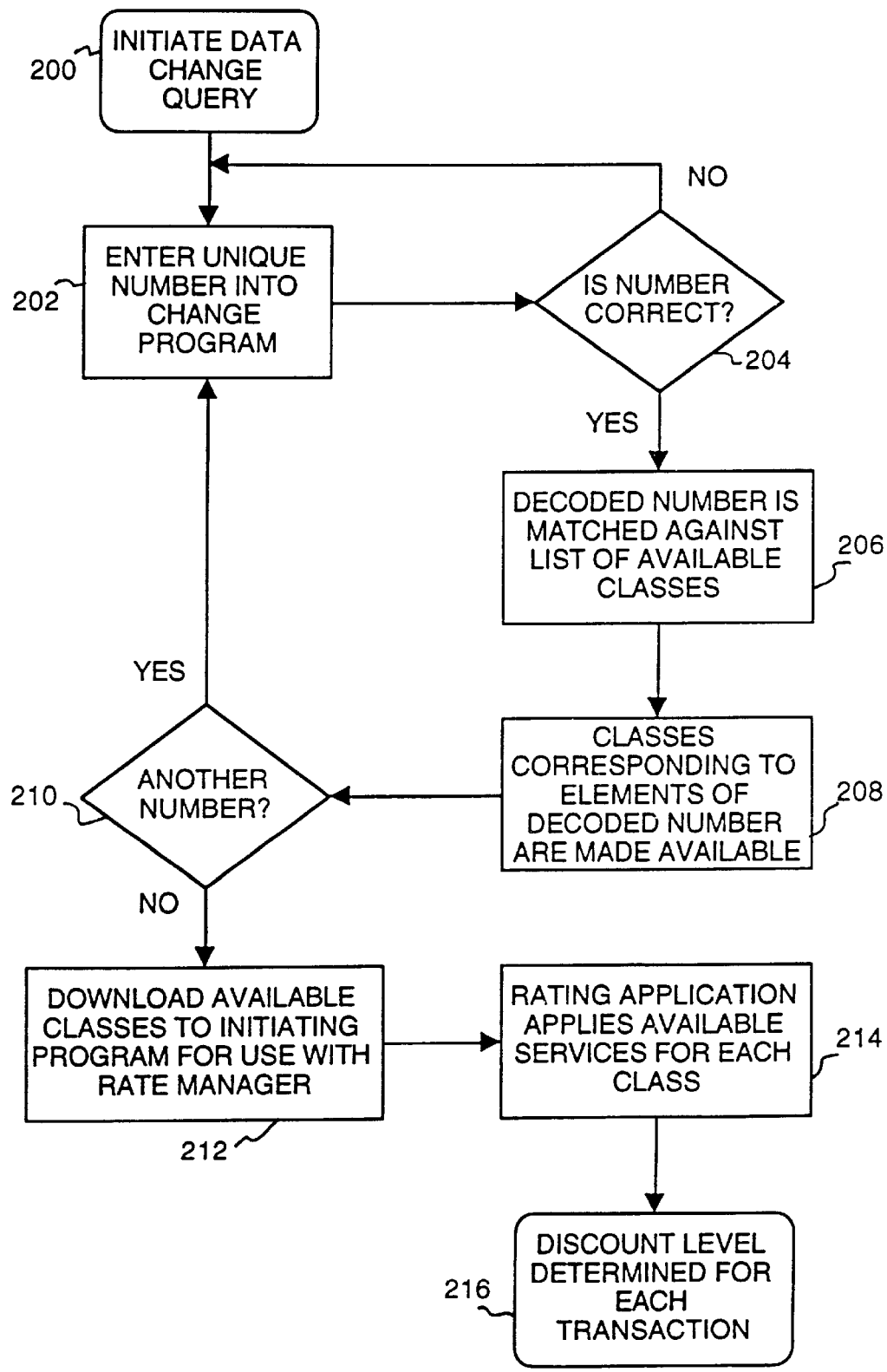
FIG. 5 is a flowchart of an alternative embodiment of the present invention in which access to specific classes of service and discount level is achieved through communication links such as the InterNet.

Having discussed the system and its general capabilities, we turn to the specific method of the present invention as is shown in FIGS. 3 through 5.

Turning to FIG. 3, there is shown an upper level flowchart of the method of utilizing a unique number that can be decoded to provide class and discount access.

The method flow begins at step 100 where an electronic scale, or similar system (such as a parcel processing system) is provided with a structure for receiving rate data. From step 100, the method advances to step 102 where applicable carriers are determined by the system operator. Typically, the carrier determination is based on factors such as: availability of classes or discounts; scope of geographical coverage of the carrier; cost of maintaining one or more carrier accounts; and, marketing plans.

Once the carrier determination has been made, the set of classes available for each carrier is established at step 104. Carriers will generally offer a number of different shipping classes based upon: time of transport; weight break; mode of transportation; distance; special handling; insurance; and, volume. Each class is further defined, in step 106, according to its component discount levels which may be based upon: weight, volume, automation standards, etc. The classes are then embedded in the memory of the electronic scale at step 108.

From step 108, the method advances to step 110 where update data is established for each class and defined by discount level. The update data is representative of those carriers, classes, and/or discounts to which a system user has subscribed for service. The class update, relative to the system and based upon the system user's requirements, is encoded at step 112 in accordance with the steps detailed in TABLE A and in TABLE B as follows:

TABLE 1

Discount Level Decoding Example

Customer inputs unique number  for line 1   6103254728   <enter>
                               for line 2   0650073021   <enter>
for line 1:

61 are the first two digits = 6 serial number digits and 1 discount level
032547 = encoded serial number as determined by:

```
  0    3    2    5    4    7
 +1   -1   +1   -1   +1   -1
  1    2    3    4    5    6  => 12 34 56
``` checksum is the last two digits = 28 and the sum of
digits 6 + 1 + 0 + 3 + 2 + 5 + 4 + 7 = 28
for line 2:

065 are the first three digits and represents carrier token "A" (41h)
00730 are the remaining five digits =>
  digit places 1,3, and 5 = 070 = class token "F" (46h)
  digit places 2 and 4 = 03 = odd; subtract 1 = discount level 2 (02h)
checksum is the last two digits = 21 and the sum
of digits 0 + 6 + 5 + 0 + 0 + 7 + 3 + 0 = 21
Therefore:

| In the nonvolatile memory = | 03 | # of bytes for serial number |
|---|---|---|
| | 12 34 56 | serial number in packed BCD |
| | 01 | # of levels |
| | 41 46 02 | discount level data - carrier token, |
| class | | token, and discount level |

TABLE 2

Discount Level Encoding Example

Information:

6 digit serial number = 123456
2 discount levels:

| 1st discount level: | carrier token = | "A" |
|---|---|---|
| | class token = | "m" |
| | discount level = | 1 |
| 2nd discount level: | carrier token = | "B" |
| | class token = | "p" |
| | discount level = | 9 |

Algorithm applied:

Serial # = 123456

```
  1    2    3    4    5    6
 -1   +1   -1   +1   -1   +1
  0    3    2    5    4    7  =  encoded serial #
``` checksum = 0 + 3 + 2 + 5 + 4 + 7 = 21
For each discount level:

Encoded carrier token + Interleave the encoded discount level with the
encoded class token:
  carrier token "A" is a 3 digit decimal => 065
  class token "m" is a 3 digit decimal => 109
  discount level 1 is odd,, so add 9 => 10
    then 065 + 11009 = 06511009
      checksum = 0 + 6 + 5 + 1 + 1 + 0 + 0 + 9 = 22
  carrier token "B" is a 3 digit decimal => 066
  class token "p" is a 3 digit decimal => 112
  discount level 1 is odd, so add 9 => 18
    then 066 + 11182 = 06611182
      checksum = 0 + 6 + 6 + 1 + 1 + 1 + 8 + 2 = 25
Therefore:

TABLE 2-continued

Discount Level Encoding Example

| encoded number = | line 1 = | 6203254721 |
| | line 2 = | 0651100922 |
| | line 3 = | 0661118225 |

Encoding of the class update at step 112, yields a unique number that is representative of a specific system user and the classes to which the user has subscribed. There are several advantages that present themselves at this point. First, a single system user, and the services utilized by that system user, can be identified with a single unique number that can be easily tracked for the purpose of customer service programs, possible volume measurement, and other statistical purposes. Secondly, a rates PROM does not have to be sent to the customer to change from one class of service to another. The system user can merely enter the assigned unique number, representative of their service preferences, and the unique number can be used to access a class/rate table.

The unique number is entered into the system by the system operator at step 114. The system advances from step 114 to step 116 where the system applies the unique number, after decoding to determine the classes within the system that the system operator is permitted to access. The now updated classes are then utilized by the system's rate manager, at step 118, to determine, at step 120, a charge for a particular class of transaction and its inherent discounts.

Turning to FIG. 4, there is shown a flowchart of the access to services as based upon decoding of the unique number.

Beginning with step 150, a unique number is assigned to a particular customer with a particular portfolio of classes and discounts. The method then advances from step 150 to step 152. At step 152, the unique number is entered into the system setup program of the electronic scale. The set program decodes, at step 154, the unique number. The purpose of decoding is to allow the system to match, at step 156, the decoded number against a list of possible services and to determine which services correspond between the decoded number and the availability list. The method then determines, at step 158, which classes of service the system is able to utilize for making rate calculations.

The system will apply the services made available in step 158 when making charge calculations in step 160. The calculations of step 160 yield an appropriate services charge which is applied, at step 162, to its underlying transaction at the electronic scale.

Turning to FIG. 5, there is shown a flowchart of an alternative embodiment of the present invention in which access to specific classes of service and discount level is achieved through communication links such as the InterNet.

The method begins at step 200 where a data change query is initiated. This query can take on any one of several forms. The query can be manually requested by asking the system to update its classes by checking with a data center for the unique number previously described herein; or, the number can be downloaded by the data center when it has determined that a change has resulted in the issuance of a unique number. A further query form can be initiated by periodic polling of the system by the data center. the polling would result in a determination that a discrepancy exists between the unique number being used by the electronic scale and the unique number on file with the data center. The discrepancy would result in the issuance by the data center of the unique number on file.

From step 200, the method advances to step 202 where the unique number is entered into the change or setup program of the electronic scale. The method then advances to the query at step 204.

Step 204 queries as to whether or not the number entered into the system is correct, if the response to the query is "NO," then the method returns to enter the system flow at step 202 where the proper unique number can be entered. If, however, the response to the query at step 204 is "YES," then the method advances to step 206 where the unique number is decoded and matched against the list of available classes. The method then advances to the query at step 210.

Step 210 queries as to whether or not a second or subsequent number is to be entered into the system. If the response to the query is "YES," then the method returns to enter the system flow at step 202 where the proper unique number can be entered. If, however, the response to the query at step 210 is "NO," then the method advances to step 212 where the available classes are downloaded to the initiating program for use with the rate manager.

The system will apply the services made available in step 212 when making charge calculations in step 214. The calculations of step 214 yield an appropriate services charge which is applied, at step 216, to its underlying transaction at the electronic scale.

While this invention has been described in connection with what is presently considered to be the most practical and preferred embodiments, it is to be understood that the invention is not limited to the disclosed embodiment, but on the contrary, is intended to cover various modifications and equivalent arrangements included within the appended claims. The specification and drawings are, accordingly, to be regarded in an illustrative rather than a restrictive sense.

What is claimed is:

1. A method of assigning rates for an electronic scale, wherein said rates are based upon class service and discount level, said method comprising the steps of:

(a) establishing a set of classes available for a particular carrier;

(b) embedding said set of classes in a memory of an electronic scale and recording said embedding in a system registry wherein said system registry is responsible for loading a particular set of classes associated with said particular carrier into the executable space of a client application;

(c) updating data in said embedded set of classes, said updating step further comprising the steps of:
   (i) defining said update data by one or more classes which comprise one or more discount levels;
   (ii) encoding a set of parameters for each one of said classes, said encoding step determining a unique number that is indicative of said parameters comprising said each one of said classes;
   (iii) placing said update data in a storage means for retaining said update data;

(d) entering, automatically under control of said client application, said unique number into a client application having a rating application wherein said rating application is embedded in said electronic scale;

(e) transferring a set of data from said storage means to said rating application; said set of data determined by decoding of said unique number;

(f) utilizing said set of data to supersede corresponding data in said embedded set of classes to create a set of new data; and (g) accessing said new data through a rates manager program of said rating application.

2. The method of claim 1, wherein said unique number triggers access to services represented by said class, said access comprising the further steps of:
   (a) entering said unique number into a setup program embedded in said electronic scale;
   (b) matching said unique number against a predetermined list of services available in said electronic scale; and
   (c) applying an algorithm to said unique number so that said available services will be available to said system user when said system user utilizes said rating application.

3. The method of claim 1, wherein said update data is stored in a PROM that is interfaced with said electronic scale.

4. The method of claim 3, wherein said PROM contains a set of all service updates available at a given point in time.

5. The method of claim 3, wherein said entry of said unique number to said electronic scale allows only those services available to a particular customer to be accessed by said electronic scale from said PROM so as to update said electronic scale with said update data.

6. The method of claim 1, wherein said each one of said classes comprises one or more discount levels.

7. The method of claim 1, wherein said unique number comprises:
   (a) a carrier token;
   (b) a class token; and
   (c) a set of discount level bytes representative of said available discount within said class.

8. The method of claim 1, wherein said rates manager returns an assigned discount level to said application, said return comprising the steps of:
   (a) determining that a class is a discount level class;
   (b) filtering out non-assigned classes; and
   (c) returning said assigned class to said application.

9. The method of claim 1, wherein said rating application comprises a menu selection table.

10. The method of claim 9, wherein said menu selection table is established by said application by placing each of said assigned classes that have been returned to said application by said rates manager into a predetermined table format; establishing an address for each element of said menu selection table wherein said address is accessed by said application when a set of rate data for a particular transaction is required by said application.

11. The method of claim 9, wherein said rates manager utilizes said menu selection table to determine which classes belong to which discount level groups.

12. A system for assigning rates to an electronic scale, wherein said rates are based upon class service and discount level, said system comprising:
   (a) an electronic scale comprising a carrier rating application;
   (b) first storage means for storing a set of data in said electronic scale, wherein said set of data represents classes of service available for a particular carrier;
   (c) second storage means for storing update data wherein said update data is defined by one or more classes which comprise one or more discount levels;
   (d) encoding means for encoding a set of parameters for each one of said classes, said encoding determining a unique number that is indicative of said parameters comprising said each one of said classes;
   (e) embedding means for embedding said update data into said second storage means for storing said update data;
   (f) interface means for interfacing said second storage means with said electronic scale and further for transferring a set of data from said second storage means to said first storage means of said electronic scale; said set of data determined by said rating application as determined by decoding of said unique number and wherein said set of data is utilized to supersede corresponding data in said first storage means;
   (g) a rates manager program, in said rating application, for determining rates based upon class of service and discount level for a particular item
   (h) decoding means for decoding said unique number so that said set of data will be defined by said unique number; and
   (i) data entry means for entering said unique number into said rating application embedded in said electronic scale.

13. The system of claim 12, wherein said electronic scale further comprises communications links for accepting said set of data from a modem.

14. The system of claim 12, wherein said data entry means is a keyboard interoperatively connected to said electronic scale.

15. The system of claim 12, wherein said first storage means is a non-volatile memory device.

16. The system of claim 12, wherein said second storage means is a PROM device.

17. A method of assigning rates for an electronic scale, wherein said rates are based upon class service and discount level, said method comprising the steps of:
   (a) establishing a set of classes of service available for a particular carrier;
   (b) embedding said set of classes in a memory of an electronic scale and recording said embedding in a system registry wherein said system registry is responsible for loading a particular set of classes associated with said particular carrier into the executable space of a client application;
   (c) linking said electronic scale with a data center via communication means;
   (d) updating data in said embedded set of classes, said updating step further comprising the steps of:
      (i) defining said update data, at said data center, by one or more classes which comprise one or more discount levels;
      (ii) defining each of said discount levels;
      (iii) encoding a set of parameters for each one of said classes, said encoding determining a unique number that is indicative of said parameters comprising said each one of said classes;
      (iv) entering said unique number into a rating application embedded in said electronic scale to allow transfer of a set of data from said data center to said electronic scale; said set of data determined by said rating application as determined by decoding of said unique number; and
      (v) transmitting said update data to said rating application via said communication means for storage in said memory means;
   (e) utilizing said set of data to supersede corresponding data in said embedded set of classes to create a set of new data; and
   (f) accessing said new data through a rates manager program of said rating application.

18. The method of claim 17, wherein said unique number triggers access to services represented by said class, said access comprising the further steps of:

(a) entering said unique number into a setup program embedded in said electronic scale;

(b) matching said unique number against a predetermined list of services available in said electronic scale; and (c) applying an algorithm to said unique number so that said available services will be available to said system user when said system user interfaces said data center to said electronic scale.

19. The method of claim 17, wherein said communication means further comprises:

(a) a first modem located at said electronic scale;

(b) a second modem located at said data center;

(c) linking means for linking said first modem with said second modem; and (d) a communications application for directing the transfer of data between said electronic scale and said data center.

* * * * *